United States Patent [19]

Smith

[11] Patent Number: 4,617,964

[45] Date of Patent: Oct. 21, 1986

[54] TIGHT SHUT-OFF VALVE WITH FLOW CONTROL

[75] Inventor: Gordon M. Smith, La Habra Heights, Calif.

[73] Assignee: Johnston Pump/General Valve, Inc., Glendora, Calif.

[21] Appl. No.: 791,748

[22] Filed: Oct. 28, 1985

[51] Int. Cl.$^4$ ............................................. F16K 5/10
[52] U.S. Cl. ............................ 137/625.3; 137/625.32; 137/614.16; 251/121; 251/123; 251/163; 251/188
[58] Field of Search ........... 137/625.28, 625.3, 614.13, 137/614.16, 625.32; 251/158, 160, 161, 162, 163, 187, 188, 121, 123

[56] References Cited

U.S. PATENT DOCUMENTS

| | | | |
|---|---|---|---|
| 2,595,160 | 4/1952 | Miller | 137/614.11 |
| 2,612,340 | 9/1952 | Laurent | 251/163 X |
| 3,526,249 | 9/1970 | Baustian | 251/121 X |
| 3,863,674 | 2/1975 | Scaglione | 251/160 X |
| 4,410,109 | 10/1983 | Morrell | 137/494 X |

Primary Examiner—Harold W. Weakley
Attorney, Agent, or Firm—Leonard Tachner

[57] ABSTRACT

A flow control apparatus for use primarily in plug-type valves provides means for continuously varying the flow rate of fluid through the valve while using the same operator that is used to control the open and closed position of the valve. The invention utilizes a globe valve-type throttling plug which requires no special mechanism to coordinate the throttling motion of the valve. Only the plug and lower plate of the valve body are modified relative to existing plug valves to achieve a unique flow control capability. The plug of the invention provides distinct inlet and outlet channels separated by a flow control passage which may be selectively obstructed by a fixed flow control element which is an integral portion of an inverted lower trunnion extending from the bottom plate of the valve body. The vertical position of the plug with the plug rotated for alignment with the inlet and outlet of the valve, determines the degree of flow through the plug.

6 Claims, 5 Drawing Figures

TIGHT SHUT-OFF VALVE WITH FLOW CONTROL

BACKGROUND OF THE INVENTION

1. Field of the Invention

The present invention relates generally to tight shut-off valves such as plug valves and more specifically, to such valves which also have a flow control element mounted in the waterway of the plug valve to provide a flow control capability for modulating flow in the opened position of the valve.

2. Prior Art

Typically, conventional plug valves provide a tight shut-off capability designed either to prevent total flow through the valve in one configuration or provide for 100% of flow through the valve in the other configuration. By way of example, one such valve is disclosed in U.S. Pat. No. 3,011,513 which describes a seat and reseat twin seal plug valve capable of double block and bleed performance. Such a prior art valve is designed to completely shut-off the flow of fluid through the valve when the passageway through the plug is oriented at 90 degrees with respect to the connecting inlet and outlet pipes. Furthermore, such prior art valves are designed to permit 100% flow through the valve when the plug passage is oriented coaxially with the inlet and outlet pipes. Such valves are not designed to provide a means for controlling the flow rate of the fluid through the valve in the open position whereby the flow of fluid through the valve is in the range between the closed and fully opened position such as where the fluid flow rate would be for example only 50% of the maximum flow rate capability of the valve.

There is prior art which discloses means for controlling the flow rate of a plug-type valve so that the maximum flow rate can be limited to be less than the capability of the valve in its fully opened position. However, there does not appear to be any prior art which permits such control in a continuously variable configuration which allows simple and expedient changes in the flow rate through the valve element using the operator that would normally be used to control the open and close position of the valve. By way of example, U.S. Pat. No. 2,140,292 to Jensen discloses means for providing a fixed maximum flow regulating orifice that is concentric with the main shut-off plug. However, Jensen does not provide for continuous modulation of the secondary control element by the common valve operator after the main shut-off plug has been rotated to the full open position. Similarly, U.S. Pat. No. 3,526,249 to Baustian discloses a control valve which has an adjustable "preset" maximum opening but again does not dislcose a continuously variable secondary element within the main blocking plug directly operable by means of the same main operator that controls the opened and closed position of the plug itself. Thus, although the prior art provides various valve designs which permit a form of flow control in a plug-type valve, the relatively fixed configuration of each such flow control scheme still leaves a substantial need for a valve design which permits convenient and readily accessible flow control variation in such a valve using the same operator that the user would otherwise employ to open and close the valve in its conventional configuration.

SUMMARY OF THE INVENTION

The present invention provides means for operating a flow control element that is positioned in the waterway of a plug valve. The invention utilizes a globe valve-type throttling plug which provides separate inlet and outlet channels divided by a flow control passage. The flow control passage is selectively obstructed to varying degrees by a fixed control element depending upon the vertical position of the plug in its normally open position. The flow control element is an integral portion of an inverted trunnion extending upwardly into the plug from the bottom plate of the valve body. The resultant valve provides a flow control valve element within a tight shut-off plug-type valve wherein the control valve portion may be operated with no modification to the rotary valve oeprators. The invention thus provides an added unique capability for continuous flow variation control in the open position of the valve with no change in the external configuration of the valve and with a simple low-cost but yet elegant improvement implemented entirely within the interior of the valve thereby giving the user an additional capability at relatively trivial additional cost.

OBJECTS OF THE INVENTION

It is therefore a principal object of the present invention to provide a flow control valve concentrically within a tight shut-off plug-valve which control valve portion may be operated with no modification to rotary valve operators.

It is an additional object of the present invention to provide a tight shut-off valve of the type having a plug therein for opening and/or closing the valve to the flow of fluid therethrough and which valve comprises an improvement consisting of a flow control element mounted in the waterway of the plug valve element to permit continuous flow control variation of the valve in its open position.

It is stil an additional object of the present invention to provide an improved plug valve having a flow control element mounted in the waterway of the plug element by means of a flow control passage separating two channels in the plug, one designated an inlet channel and the other designated an outlet channel, the passage being fully or partially obstructed by the flow control element depending on the vertical position of the plug after the plug has been rotated into its normally open position, the flow control element being integral with an inverted trunnion extending upwardly into the plug from the bottom plate of the valve body.

It is still an additional object of the present invention to provide a combined flow control and double block and bleed valve in which the flow control portion of the invention is provided for permitting the user to continuously vary the fluid flow rate through the valve in its open position without requiring any modification to the external configuration of the valve or to the rotary valve operator associated with the valve.

BRIEF DESCRIPTION OF THE DRAWINGS

The aforemetnitoned objects and advantages of the present invention as well as additional objects and advantages thereof will be more fully understood hereinafter as a result of a detailed description of a preferred embodiment when taken in conjunction with the accompanying drawings in which.

DETAILED DESCRIPTION OF A PREFERRED EMBODIMENT

Figure 1:
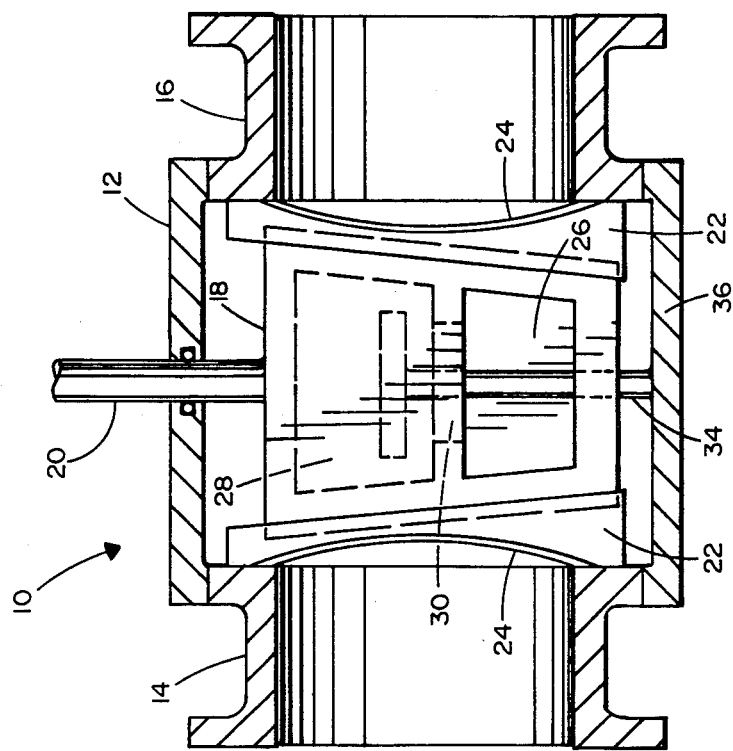
FIG. 1 is a cross-sectional view of the invention shown in its fully closed position.

Referring now to FIG. 1 it will be seen that the seat and reseat plug-type valve 10 of the present invention comprises a valve body 12 having an inlet 14, an outlet 16 and a plug 18. The plug is slideably connected to a pair of slips 22 each of which is provided with a seal 24 to permit water-tight compressive engagement between the slips and the inlet 14 and outlet 16, respectively when the valve is closed. Plug 18 is of a truncated conical configuration and slips 22 are wedge-shaped so that upon upward vertical motion of plug 18 in reponse to an operator mechanism connected to the upper trunnion 20, the slips are retracted from the interior surface 38 of valve body 12 whereby to permit rotation of the plug and slips without scoring the interior surface.

One of the unique features of the present invention resides in the plug 18. More specifically, as seen in FIG. 1, plug 18 is provided with an inlet channel 26 and an outlet channel 28. These two channels are separted by a flow control passage 30. As will be seen hereinafter, when the plug is in its fully open position, fluid enters the inlet 14 of the valve 10 and then passes through inlet channel 26 of the plug 18 and upwardly into the outlet channel 28 of the plug through the flow control passage 30. The fluid then passes into the outlet 16 and exits the valve 10. All fluid passing through the valve in its open position must therefore pass through the flow control passage 30.

Figure 2:
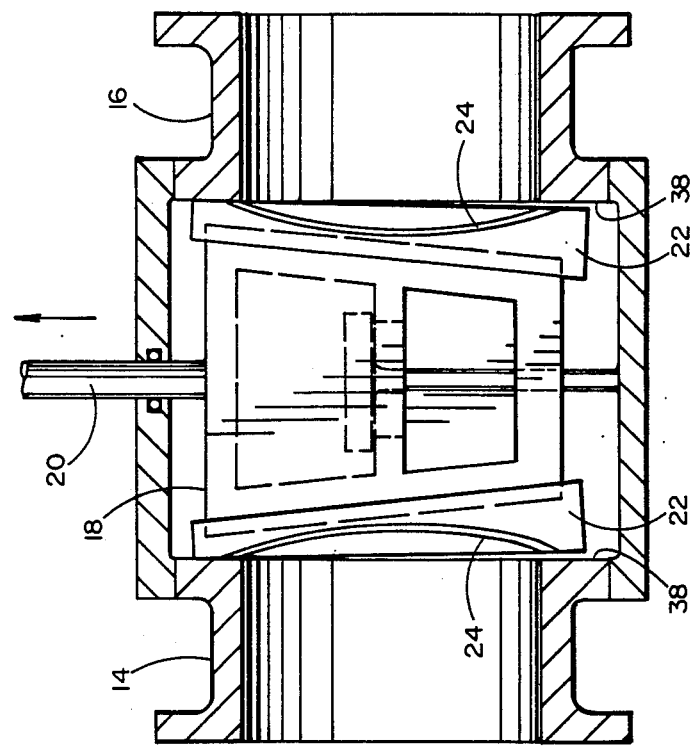
FIG. 2 is a cross-sectional view of the present invention illustrating its configuration after the plug portion thereof has been raised as the first step in opening the valve.

The configuration of valve 10 shown in FIG. 1 corresponds to its closed position in which the plug 18 is in its lowermost position within the valve body 12 and it is rotated so that both the inlet channel 26 and outlet channel 28 are oriented substantially perpendicular to the flow axis between inlet 14 and outlet 16. In addition, the vertical position of plug 18 forces slips 22 into compressed engagement with the interior surface 38 of the valve body 12 thereby assuring a double block configuration which permits valve 10 to be bled if desired for maintenance purposes while the valve is in its closed position. The first step in opening the valve 10 is illustrated in FIG. 2 wherein it is shown that the plug 18 has been raised within the valve body 12 thereby retracting the slips 22 from the interior surface 38 of the valve body thereby substantially disengaging the seals 24 from the interior surface 38 of the valve body 12. This upward movement of the plug 18 is obtained by means of a valve operator (not shown) applying vertically upward force to the upper trunnion 20 as indicated by the arrow in the uppermost portion of FIG. 2. In all other respects the configuration of the valve as seen in FIG. 2 is identical to that shown in FIG. 1.

Figure 4:
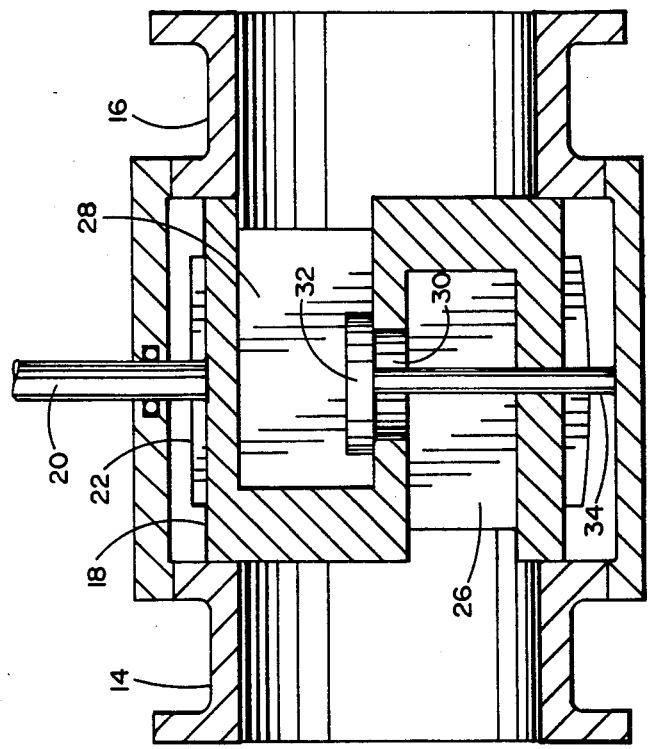
FIG. 4 is a cross-sectional view of the present invention similar to that of FIG. 3 but showing the interior of the plug portion thereof for illustrating the interaction between the plug portion of the valve and the flow control element thereof.
Figure 3:
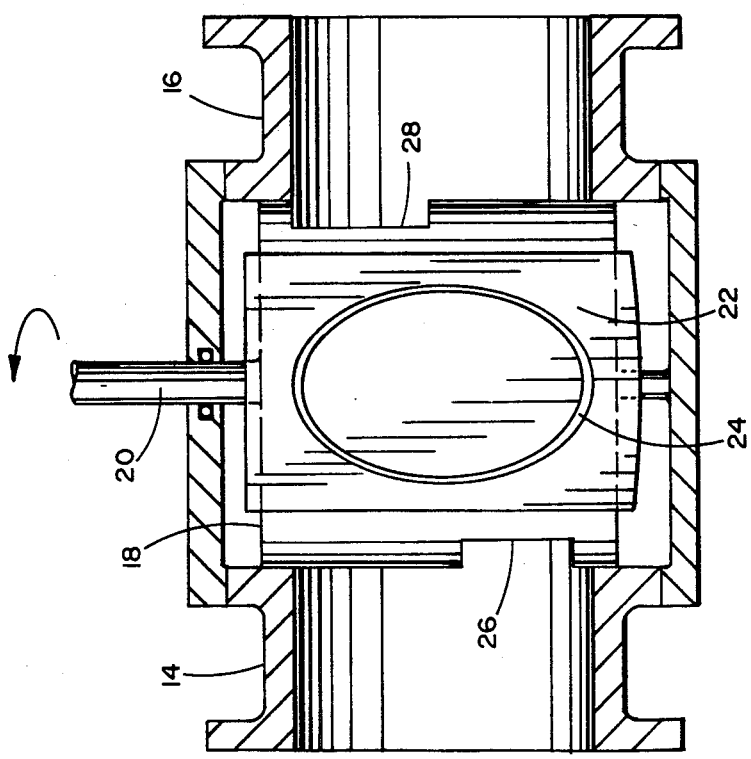
FIG. 3 is a cross-secctional view of the present invention shown in its configuration after the plug portion thereof has been rotated a ¼ turn as the second step in opening the valve.

The next step in the sequence in opening the valve 10 is illustrated in FIG. 3. More specifically, as seen in FIG. 3, in this configuration the plug 18 has been rotated substantially 90 degrees or ¼ turn in order to place the inlet channel 26 and outlet 28 of the plug in a parallel position relative to the flow axis through inlet 14 and outlet 16. As seen in FIG. 3 the slips 22, which are slideably connected to the plug 18, have also been rotated through the ¼ turn. FIG. 4 shows the valve 10 of the present invention in the same configuration as it is shown in FIG. 3 but with the plug 18 cut away to reveal the interior details of the plug 18, channels 26 and 28 and the flow control element of the present invention in more detail. More specifically, referring to FIG. 4 it will be seen that a second feature of the present invention resides in a flow control element 32 which is connected to a lower trunnion 34. Trunnion 34 is an integral extension of lower plate 36 of the valve body 12. The lower trunnion 34 and connected or integral flow control element 32, remain fixed at all times during opening and closing of valve 10. However, it will be seen that the length of lower trunnion 34 and the relative position of flow control element 32 to the flow control passage 30 is such that when the plug 18 is in its uppermost vertical travel as shown in FIGS. 3 and 4, the flow control element 32 substantially blocks the flow control passage 30. Lower Trunnion 34 serves the additional conventional function of providing an axial element about which plug 18 may rotate. Thus, although plug 18 has been rotated so that the plug channels 26 and 28 are parallel to the flow axis through inlet 14 and outlet 16, respectively, the flow through the valve 10 remains substantially shut-off by the blocking relationship of flow control element 32 with respect to flow control passage 30.

Figure 5:
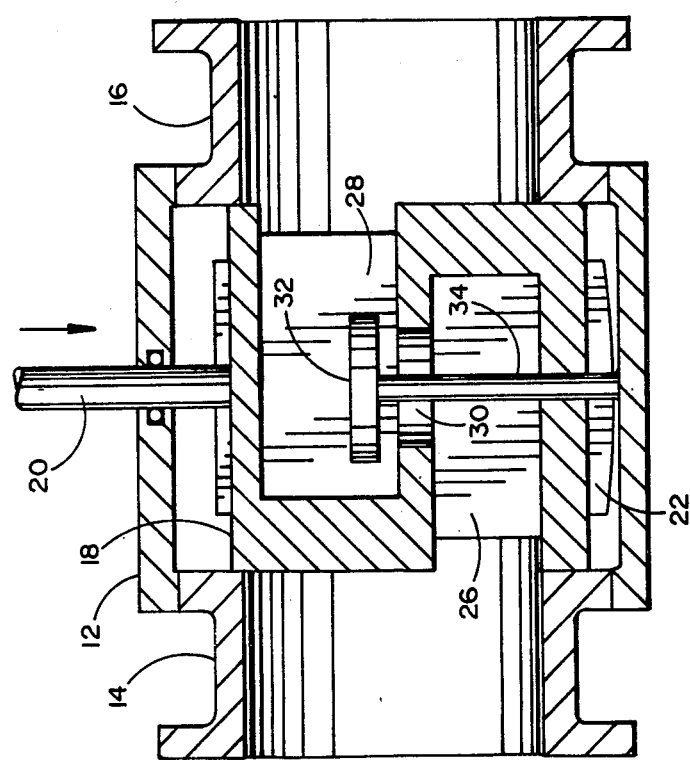
FIG. 5 is a cross-sectional view of the present invention similar to that of FIG. 4 but showing the valve in its configuration wherein the plug portion thereof has been moved downwardly to its fully opened position.

The final step in the sequence of opening valve 10 is illustrated in FIG. 5. One of the significant novel features of the present invention is that the step illustrated in FIG. 5 serves a dual purpose in the present invention. More specifically, in conventional valves the step illustrated in FIG. 5 reseats the plug 18 within the valve body 12 so that the flow passage through the plug is normally then aligned with the flow access through inlet 14 and outlet 16, respectively. However, in the present invention this step also provides a degree of control of passage 30 by lowering the flow control passge away from the flow control element 32 as seen in FIG. 5. Thus, the extent to which the upper trunnion 20 is pushed downwardly by the valve operating elements (not shown) to place the channels 26 and 28 in alignment with the inlet 14 and outlet 16, respectively, also determines the extent of fluid flow through flow control passage 30 because of the gap created between that passge and the flow control element 32. Thus for example, if the plug 18 were lowered to some intermediate position between the extremes illustrated in FIGS. 4 and 5, respectively, the flow of fluid through the valve 10 would be of course greater than the substantially blocked configuration of FIG. 4, but yet substantially less than the open configuration of FIG. 5. Thus, the present invention provides means for controlling the fluid flow through the valve by simply controlling the vertical position of plug 18 with the channels 26 and 28 in their flow configurations.

It will be clear that the sequence for closing the valve is identical to that shown for opening the valve but with the steps reversed. Thus for example, if the valve where opened in the configuration illustrated in FIG. 5, the first step would be to raise the upper trunnion 20 thereby raising plug 18 whereby to place the flow control element 32 in its substantially blocking configuration relative to flow control passage 30. The plug 18 would then be rotated ¼ turn in a direction opposite to that shown in FIG. 3 thereby placing the valve in the configuration illustrated in FIG. 2. Finally, the upper trunnion 20 would be lowered thereby lowering the plug 18 within the valve body 12 and re-engaging the slips 22 and seals 24 with the interior surface 38 of the valve body 12.

Those having skill in the art to which the present invention pertains will now understand that what has been disclosed herein comprises a novel tight shut-off valve of the plug-type but having flow control which permits throttling of the flow between substantial blockage and substantial full flow capacity. Furthermore, it will be understood that this flow control feature of the present invention is accomplished with no modification to the external structure of the valve and no modification to the valve operator mechanism. It is the normal vertical position control of the plug which is ordinarily used to reseat the plug in the open valve configuration which varies the degree of flow by controlling the spacing between a fixed flow control element and a flow control passage between separate inlet and outlet channels within the plug.

As a result of the applicant's teaching herein it will now be apparent to those having skill in the relevant art that various modifications and additions may be made to the present invention. By way of example, various other valve and plug geometries would be suitable for implementing flow control in the manner herein described. Furthermore, other means for providing a controllable spacial relationship between a fixed flow control element and flow control passage through the plug will now become apparent to those who have had the benefit of the applicant's teaching. However, all such modifications and additions are deemed to be within the scope of the present invention which is to be liminted only by the claims appended hereto.

I claim:

1. A seat and reseat valve of the type including a valve body having a rotatable plug for aligning a flow passge in the plug with an inlet and outlet when the valve is opened and for blocking the inlet and outlet with retractable slips connected to the plug when the valve is closed; the valve comprising:

an inlet channel and an outlet channel in said plug, said channels being separated by a flow control passage; and a flow control element fixed relative to said valve body and positioned adjacent said flow control passage whereby to control flow through said valve in response to movement of said plug.

2. The valve recited in claim 1 further comprising an upper trunnion for controlling the position of said plug and a lower trunnion for interconnecting said flow control element and said valve body and providing an axial element about which said plug may rotate.

3. The valve recited in claim 1 wherein said flow control element is positioned within said outlet channel above said flow control passage whereby upward vertical motion of said plug engages said flow control element with said flow control passage and downward vertical motion of said plug selectively disengages said flow control element from said flow control passage for permitting control of flow through said flow control passage.

4. An improved seat and reseat valve of the type having a valve body housing a rotatable plug for aligning a flow passage in the plug with an inlet and an outlet when the valve is opened and for blocking the inlet and outlet with retractable slips connected to the plug when the valve is closed; the improvement comprising:

means separating said flow passage into two distinct flow channels having a unitary flow control passage therebetween; and means fixed relative to said flow control passage and responsive to the vertical position of said plug for selectively controlling the flow through said channels.

5. The improvement recited in claim 4 further comprising an upper trunnion for controlling the position of said plug and a lower trunnion for interconnecting said flow control element and said valve body and providing an axial element about which said plug may rotate.

6. The improvement recited in claim 4 wherein said fixed means comprises a flow control element positioned within one of said flow channels adjacent said flow control passage whereby vertical movement of said plug in a first direction blocks said flow control passage and vertical movement of said plug in a second direction selectively opens said flow control passage.

* * * * *